United States Patent
Soto et al.

(10) Patent No.: US 8,339,371 B2
(45) Date of Patent: Dec. 25, 2012

(54) USER INTERFACE DEVICE FOR CONTROLLING AN AUDIO VISUAL SYSTEM

(75) Inventors: Jorge Soto, Oakland, CA (US); Paul Rymarz, Pleasanton, CA (US); Rachel Bautista, San Francisco, CA (US); Joe MacCarthy, Oakland, CA (US)

(73) Assignee: Leapfrog Enterprises, Inc., Emeryville, CA (US)

( * ) Notice: Subject to any disclaimer, the term of this patent is extended or adjusted under 35 U.S.C. 154(b) by 966 days.

(21) Appl. No.: 12/396,360

(22) Filed: Mar. 2, 2009

(65) Prior Publication Data

US 2010/0066687 A1    Mar. 18, 2010

Related U.S. Application Data

(60) Provisional application No. 61/096,483, filed on Sep. 12, 2008.

(51) Int. Cl.
*G06F 3/041* (2006.01)
(52) U.S. Cl. ............... 345/173; 463/3; 463/30; 463/31; 463/36; 273/317.1; 273/317.2; 273/317.3; 273/317.4; 273/317.6; 273/317.5; 273/108.3; 273/461
(58) Field of Classification Search ................. 345/173; 463/3, 36, 23, 30–31; 273/317.1–317.6, 273/108.3, 461
See application file for complete search history.

(56) References Cited

U.S. PATENT DOCUMENTS

| | | | | |
|---|---|---|---|---|
| 4,573,682 | A * | 3/1986 | Mayon | 273/148 B |
| 4,720,789 | A * | 1/1988 | Hector et al. | 463/33 |
| 5,405,152 | A * | 4/1995 | Katanics et al. | 463/2 |
| 5,551,701 | A * | 9/1996 | Bouton et al. | 463/36 |
| 5,907,318 | A * | 5/1999 | Medina | 345/163 |
| 6,270,403 | B1 * | 8/2001 | Watanabe et al. | 463/7 |
| 6,685,480 | B2 * | 2/2004 | Nishimoto et al. | 434/247 |
| 7,578,505 | B2 * | 8/2009 | Mcilvain et al. | 463/4 |
| 2001/0005692 | A1 * | 6/2001 | Song | 463/43 |
| 2004/0127285 | A1 * | 7/2004 | Kavana | 463/36 |

* cited by examiner

*Primary Examiner* — Wayne Young
*Assistant Examiner* — Linh Hoffner (57) ABSTRACT

A user interface device for controlling an audio visual system. In one embodiment, a device for interfacing with an audio/visual system includes a sensor mat including a surface and operable to be disposed on a substantially flat floor. The sensor mat is further operable for generating electrical signals responsive to physical interactions of a user with the surface. The interface device also includes an electronic control unit including circuitry for coupling to the mat, the electronic control unit for detecting the physical interactions of the mat and the electronic control unit operable to be placed on the substantially flat floor. The interface device further includes an elongated shaft having a first end and a second end and physically coupled to the electronic control unit via the first end and extending laterally therefrom. The second end of the elongated shaft is operable to be displaced in various directions by interactions with both hands of the user. The electronic control unit is operable to detect the various directions wherein further the electronic control unit is operable to transmit signals representing the various directions and the physical interactions to a receiver unit.

18 Claims, 5 Drawing Sheets

USER INTERFACE DEVICE FOR CONTROLLING AN AUDIO VISUAL SYSTEM

RELATED APPLICATION

This Application claims benefit of U.S. Provisional Application 61/096,483, filed 12 Sep. 2008, entitled "User Interface and Receiver Unit for Interactive Program Experience," to Soto et al., which is hereby incorporated herein by reference in its entirety.

FIELD OF INVENTION

Embodiments of the present invention relate to the field of user interface devices. More specifically, embodiments of the present invention relate to systems and methods for user interface devices for controlling an audio visual system.

BACKGROUND

The following descriptions are not admitted to be prior art by virtue of their inclusion in this section.

There are myriad devices for interfacing or controlling computer systems or computer-based systems, e.g., video games or educational environments. Such devices include, for example, mouse pointing devices, trackballs, joysticks, isometric joysticks, e.g., pointing sticks, keyboards, light pens, thumbwheels and the like. However, such interface devices are generally not designed for very young users, e.g., children three to six years old. Because the motor skills of such children differ from the motor skills of adults, such devices generally perform poorly when used by young children, which may lead to a poor interaction with a system, user frustration and even device damage.

SUMMARY OF THE INVENTION

Therefore, a need exists for improved systems and methods for user interface devices. In addition, a need exists for systems and methods for user interface devices that are designed for interaction with young children. A further need exists for systems and methods user interface devices that are compatible and complementary with existing computer systems and computer-based systems. Embodiments in accordance with the present invention provide for these needs.

Accordingly, a user interface device for controlling an audio visual system is disclosed. In one embodiment, a device for interfacing with an audio/visual system includes a sensor mat including a surface and operable to be disposed on a substantially flat floor. The sensor mat is further operable for generating electrical signals responsive to physical interactions of a user with the surface. The interface device also includes an electronic control unit including circuitry for coupling to the mat, the electronic control unit for detecting the physical interactions of the mat and the electronic control unit operable to be placed on the substantially flat floor.

The interface device further includes an elongated shaft having a first end and a second end and physically coupled to the electronic control unit via the first end and extending laterally therefrom. The second end of the elongated shaft is operable to be displaced in various directions by interactions with either or both hands of the user. The electronic control unit is operable to detect the various directions and to transmit signals representing the various directions and the physical interactions to a receiver unit.

In accordance with another embodiment of the present invention, a device for user input to a computer system includes a shaft having a nominally vertical rest position. The shaft is pivotably coupled to a base. The device includes a mechanism for converting a movement of the shaft from the rest position into a plurality of electrical representations of a direction of the movement and an electronic circuit for communicating the plurality of electrical representations to the computer system. The base is disposed to rest on a flat surface suitable for supporting a human user, and the base is disposed for supporting the shaft in the rest position and during the movement. A top of the shaft is in the range of 18 to 26 inches above the flat surface when coupled to the base. The computer system may be remote and coupled to the device via wireless communication. The computer system may be connected to a display device.

In accordance with a method embodiment of the present invention, a method for controlling an audio visual system utilizing an interface device includes a computer system coupled to a display device accessing a change of direction signal from the base. Responsive to the change of direction signal, a directional component of application software of the computer system is changed, which may cause a change in a visual component of the display. Responsive to a lack of the change of direction signal, operation of the directional component of application software continues in the changed direction.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise indicated, the drawings are not to scale.

DETAILED DESCRIPTION

Reference will now be made in detail to various embodiments of the present invention, examples of which are illustrated in the accompanying drawings. Wile the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, steps, logic blocks, processing, and other symbolic representations of operations on data bits that can be performed on computer memory. Such computer memory is functionally coupled to a processor. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. Such quantities may be represented in a wide variety of computer usable media, including, for example, computer memory, e.g., RAM or ROM, removable memory, e.g., flash memory, bubble memory, optical storage, e.g., CD or DVD, magneto-optical storage, magnetic storage, e.g., drum, hard drive, diskette or tape, paper tape, punch cards and the like. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. It is appreciated that throughout the present invention, discussions utilizing terms such as "accessing" or "changing" or "continuing" or "displaying" or "generating" or "loading" or "recognizing" or "producing" or "decoding" or "recording" or "interfacing" or the like, often refer to the action and processes of an electronic system (e.g., receiver unit 200 of FIG. 2A), or similar electronic computing device, that manipulates and transforms data represented as physical (electronic) quantities within the electronic device's registers and memories into other data similarly represented as physical quantities within the electronic device memories or registers or other such information storage, transmission or display devices.

USER INTERFACE DEVICE FOR CONTROLLING AN AUDIO VISUAL SYSTEM

Figure 1:
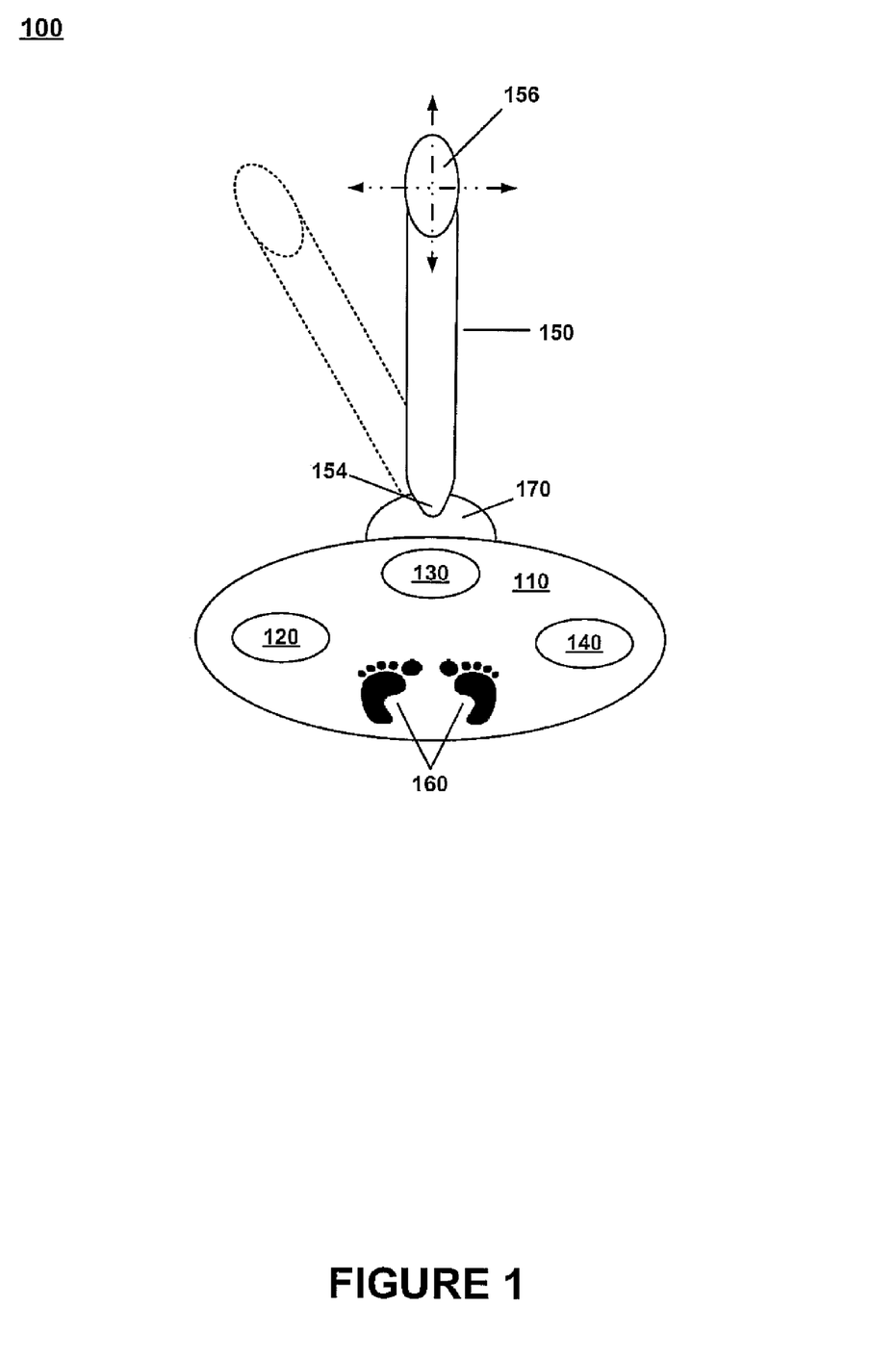
FIG. 1 illustrates a user interface device for controlling an audio visual system, in accordance with embodiments of the present invention.

FIG. 1 illustrates a user interface device 100 for controlling an audio visual system, in accordance with embodiments of the present invention. Device 100 includes a flexible sensor mat 110. Sensor mat 110 is operable to be placed substantially flat, e.g., on a floor. Sensor mat 110 comprises a plurality of pressure sensors, e.g., sensors 120, 130 and 140. The number of sensors may vary, in accordance with embodiments of the present invention. The plurality of pressure sensors are responsive to pressure, e.g., from a user stepping on such sensor(s). The sensors should be durable to withstand repeated stepping and/or "stomping."

The plurality of pressure sensors may be visually identified by alphanumeric symbols, graphics, pictures, coloration or the like. The plurality of pressure sensors may also be differentiated from other portions of sensor mat 110 by tactile differences, e.g., a different texture, bumps, ridges or the like. The sensor mat 110 should have a non-slip backing, e.g., to prevent inadvertent movement while in use. Sensor mat 110 may optionally comprise a visual and/or tactile rest or "home" position 160 for a user's feet. Home positions 160 may comprise active pressure sensors, in accordance with embodiments of the present invention. In an exemplary embodiment, a sensor mat is approximately oval with measurements of 29 inches by 19 inches by 0.25 inches.

Interface device 100 may optionally comprise a control unit housing 170. Control unit housing may protrude above a plane of sensor mat 110. Control unit hosing 170 may contain electronics, batteries, wiring, signaling devices and other mechanisms necessary for the function of device 100.

Device 100 further comprises a directional control element 150. Directional control element 150 comprises a tube or shaft extending vertically from sensor mat 110 and/or control unit housing 170. In accordance with embodiments of the present invention, directional control element 150 is not required to have any particular cross section, nor is the cross section necessarily consistent throughout the length of directional control element 150.

Directional control element 150 may be constructed from materials including foam and ethylene vinyl acetate (EVA) materials to promote resilience and safety for use by young children. Directional control element 150 may comprise a variety of different materials. For example, lower portions of directional control element 150, e.g., nearer to sensor mat 110, may comprise relatively stiff and/or hard materials, suitable to provide the requisite strength, resilience and suitable to communicate directional movement to a movement sensing mechanism. In contrast, upper portions of directional control element 150 may be relatively softer and more flexible, suitable for safe interaction with a young child during rough or "hard" use. A softer and more flexible upper portion also provides padding when a child hits or slap the directional control element 150.

In an exemplary embodiment, e.g., for children aged 3 to 5 years old, directional control element 150 is about 24 inches from the bottom of sensor mat 110, e.g., the floor. More generally, directional control element 150 may be sized to rise to about mid chest level of a target user. For example, for a young child, directional control element 150 may be sized in a range of about 18 to 26 inches from the bottom of sensor mat 110.

At rest, directional control element 150 is substantially perpendicular to sensor mat 110. In use, directional control element 150 is operable to be displaced substantially in a plane parallel to the sensor mat, e.g., parallel to the floor. For example, directional control element 150 may be rotated about a pivot point 154 such that its top portion 156 moves forward, backward, left or right, relative to a user. Directional control element 150 may be limited to movement in a limited number of directions, or it may be capable of movement in all directions of its movement plane. In an exemplary embodiment, the top of directional control element 150 may be displaced up to about four inches. A relatively large travel, such as about four inches, is advantageous for a directional control element 150 that is mid-chest in height. It allows directional control element 150 to be controlled with gross movements such as slaps, strikes and blows rather than fine motor movement of one or more fingers.

Directional control unit 150 may be known as or referred to as a "bopper," e.g., a device for receiving slaps, blows, punches or strikes from one or both hands or arms of a user. The term "bopper" emphasizes the substantial differences between this device and conventional user interface devices. Whereas conventional user interface devices are generally utilized with low force and fine motor skills, e.g., as of an adult, embodiments in accordance with the present invention are designed for use with high force and gross motor skills, typical of young children. For example, a user is generally in extended contact with a conventional user interface devices, e.g., a mouse or a joystick. For example, an adult user applies just enough force to a joystick to displace the joystick, and holds it in such a position until a cursor has moved to a desired location. In contrast, embodiments in accordance with the present invention are disposed to receive one or more strikes of significantly greater force than under the conventional art, and to respond appropriately to such strikes.

Directional control element 150 may also have one or more buttons or other controllers on its surface. For example, a single, large button could be placed on top of element 150 to allow for additional input to directional control element 150.

At the base of directional control element 150, directional control element 150 is physically coupled to sensor mat 110. The coupling may be made via the optional control unit hosing 170. The coupling provides mechanical support to directional control element 150, as well as a mechanism to convert the movements of directional control element 150 into electrical signals. In accordance with embodiments of the present invention, directional movement of directional control element 150 may be converted to electrical signals representing fewer directions than the physical movement of directional control element 150. In an exemplary embodiment, movement of directional control element 150 may be converted to electrical signals representing four directions of movement—e.g. forward, backward, left and right. Directional control element 150 may be removable from sensor mat 110 and/or control unit housing 170, e.g., to enable storage. For example, the coupling may comprise a slot in optional control unit hosing 170 disposed to capture the base of directional control element 150.

Interface device 100 further comprises a control system (not shown), which may be housed in the optional control unit hosing directional control element 150. The control system may comprise electronics, batteries, wiring, signaling devices and other mechanisms necessary for the function of device 100. The control system interprets the physical actions of a user upon the plurality of pressure sensors and the directional control unit, and converts such actions into electrical signals. As previously described, the control system converts directional movement of directional control unit 150 into electrical signals representing such directional movement. The control unit may also convert displacement of directional control unit 150 and/or force applied to directional control unit 150 into electrical signals representing such displacement and/or force.

Interface device 100 may further comprise additional actuators, e.g., buttons, for additional functions, e.g., power control and/or "help" functions. Such actuators may be pressure actuated, as pressure sensors 120, 130 140, disposed for foot activation. Alternatively, such additional actuators may comprise buttons or switches disposed for activation by children's hands. In one embodiment, a power actuator is "child-safe," intended for adults-only operation.

Figure 2A:
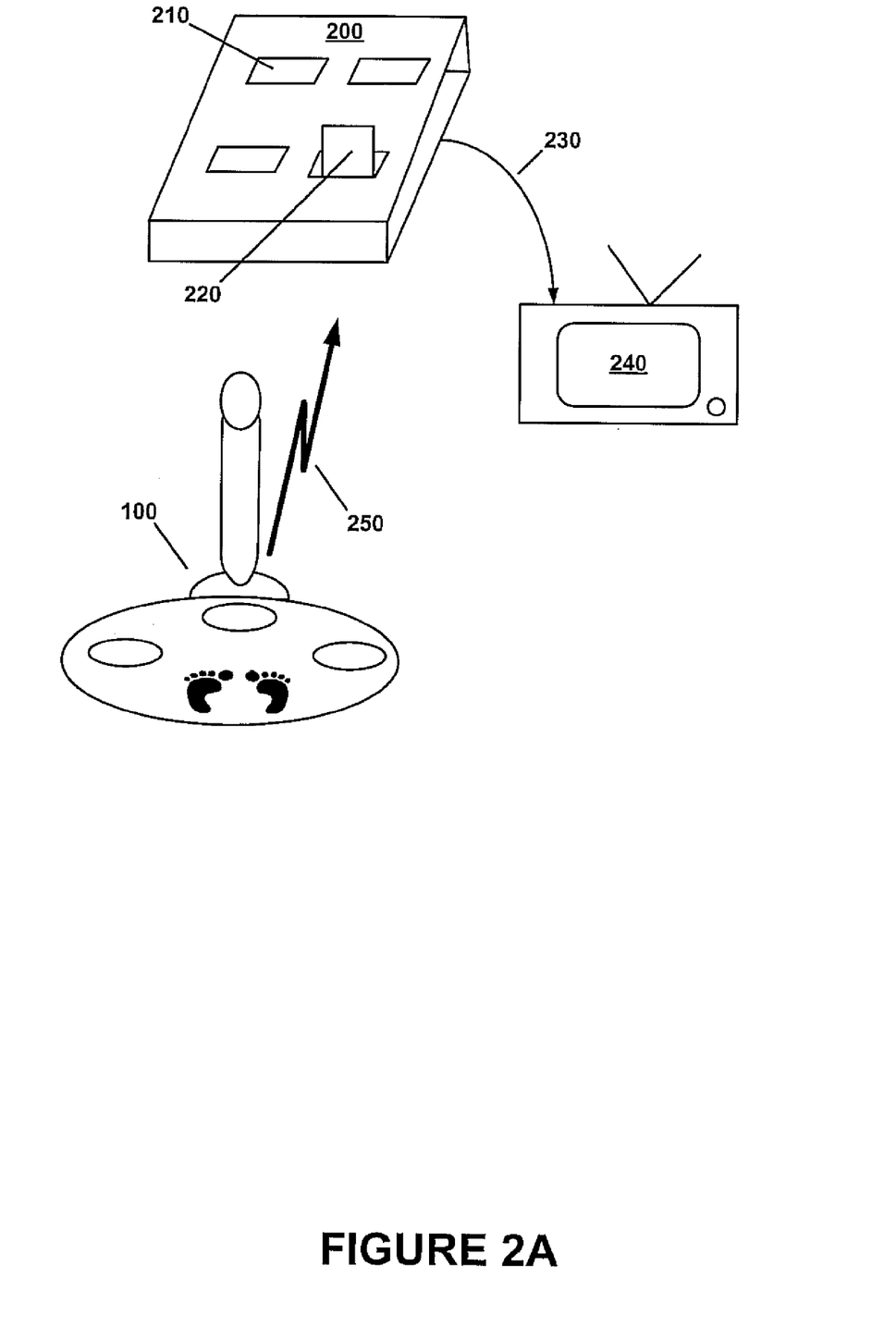
FIG. 2A illustrates a system diagram in which an interface device is communicatively coupled with a receiver unit, in accordance with embodiments of the present invention.

FIG. 2A illustrates a system diagram in which an interface device 100 is communicatively coupled 250 with a receiver unit 200, in accordance with embodiments of the present invention. The coupling 250 may be one or two way, and the coupling may be wired or wireless. The coupling 250 should be capable of communication over a distance suitable for separation of the interactive device 100 from the display unit 240, e.g., at least 15 feet. The coupling 250 is well suited to a variety of wired and wireless communication media and protocols, including, for example, RS-232, universal serial bus, infrared, Bluetooth, IEEE 802.11, Ethernet and the like.

Receiver unit 200 is a computer based system comprising a processor, bus and memory containing program instructions. The memory, e.g., program memory, may be housed in removable cartridges, e.g., program cartridge 220, coupled to receiver unit 200 via program cartridge slots 210. In an alternative embodiment, software programs may be downloaded into program memory within receiver unit via the Internet, for example, by means of a USB connection with a personal computer. Some slots 210 may be non functional for storage of program cartridges while not in use. Receiver unit 200 may also comprise internal non-volatile program memory, for example, for operating system software and/or base-level, e.g., "shipped with," program content.

In accordance with embodiments of the present invention, receiver unit 200 is well suited to receiving input signals from devices other than interface device 100. For example, receiver unit 200 may receive input from wand-like devices, steering wheels, keyboards and/or position-sensing devices, e.g., based on accelerometers.

Receiver unit 200 utilizes signals received from interface device 100 as input to control portions of a program capable of producing images operating on receiver unit 200. For example, a user interacting with sensor mat 110 and/or directional control unit 150 controls aspects of a program operating on receiver unit 200. Receiver unit 200 further is functionally coupled 230 to display device 240, e.g., a home television set or similar device, for program output, e.g., audio and/or video output. The coupling 230 may be any well known coupling suitable for conveying video and/or audio signals to display device 240. For example, coupling 230 may comprise analog baseband audio and video wiring terminated by RCA-type connectors. Alternatively, the coupling 230 may be digital, e.g., a High-Definition Multimedia Interface (HDMI).

Embodiments in accordance with the present invention are directed to a user interface mechanism 100 (FIG. 1) that is in communication with a processor/receiver unit 200 (FIG. 2A) for controlling an audio/video device 240, such as a television set. The user interface mechanism is operable to be interfaced with by a user, e.g., a child, in one embodiment. In one embodiment, the user interfaces with the mechanism using both hands and feet. Responsive to these interactions, audio/video signals are generated for the display device (television set) 240 thereby creating an interactive experience for the user.

In one embodiment, the user interface mechanism contains a sensor mat 110 (FIG. 1) that is coupled electrically and physically to an electronic control unit or base unit. The sensor mat 110 and the control unit are operable to be placed on a substantially flat surface, e.g., on a floor facing the display device (television set) 240 (FIG. 2A). The user may step on the surface of the mat. Also connected to the control unit is a directional control unit 150 extending vertically from the control unit. The directional control unit 150 is coupled to the control unit at one end, and the user interfaces with the other end of the directional control unit 150.

The other end of the directional control unit 150 is free to move when displayed, e.g., forward, back, left and right, with respect to a user facing the directional control unit 150. In this way, the control unit can record the displacements of the directional control unit 150 based on the movement of the end that is coupled to the control unit. It is appreciated that more than four directions can be sensed and the above is exemplary only.

The directional control unit 150 is dimensioned such that it reaches approximately the chest level of a small child facing the directional control unit 150 so that interaction with the top of the directional control unit 150 is easy using both hands of the user while standing on the sensor mat 110 surface. In one embodiment, the directional control unit 150 can be removed from the control unit for ease in shipping and storing. Also, the sensor mat 110 can be rolled up, again for ease in shipment and storing. The base unit may have a home button or power button or reset button disposed thereon.

The sensor mat 110 is operable to be interacted with by the feet of the user and contains various predetermined regions that can detect interaction therewith. These signals are reported to the control unit that can detect the interaction. The control unit therefore can detect interaction with the directional control unit 150 and also the regions of the sensor mat 110. This information is transmitted in real time to a receiver unit 200 (FIG. 2A). This can be communicated wirelessly (e.g., RF or IR) in one embodiment.

The receiver unit 200 contains a processor and a bus and a memory containing program instructions. The memory may be removable, e.g., a cartridge. The instructions may implement an interactive game or other educational content that responds to the information sent by the user interface mechanism 100. The receiver unit is operable to be connected 230 to the display device (television set) 240 for driving audio/video signals thereto (e.g., RCA connector) that are responsive to the user interface mechanism. The receiver unit 200 can also contain various games/program titles that can be selected by the user.

In one embodiment, the sensor mat 110 contains printing thereon containing images that create a theme in color and in content The sensor regions 120-140 can also be identified by the printing so that user can interact therewith. Two regions are associated with the left and right feet of the user, in one embodiment. The directional control unit 150 can be made of soft material at the end that interfaces with the user. In one embodiment, the directional control unit 150 is operable to be "bopped' or lightly struck by both hands of the user in order to be displaced forward, backward, left or right, for instance. During typical game play, e.g., educational games, the user interacts with the directional control unit 150 or "bopper" while moving his/her feet to interact with the surface of the mat. This is performed while the user receives interactive game play from the display device (television set).

In an exemplary embodiment, the user interface mechanism is battery operated. The receiver unit may be battery operated or may require line power and may comprise an on/off button. Typically, the receiver unit can be placed on top of or near the display device (television set) and positioned to receive the wireless signals from the base unit. The base unit is positioned in front of the display device (television set). A cartridge is inserted into the bus and the processor begins to play the selected software title.

Figure 2B:
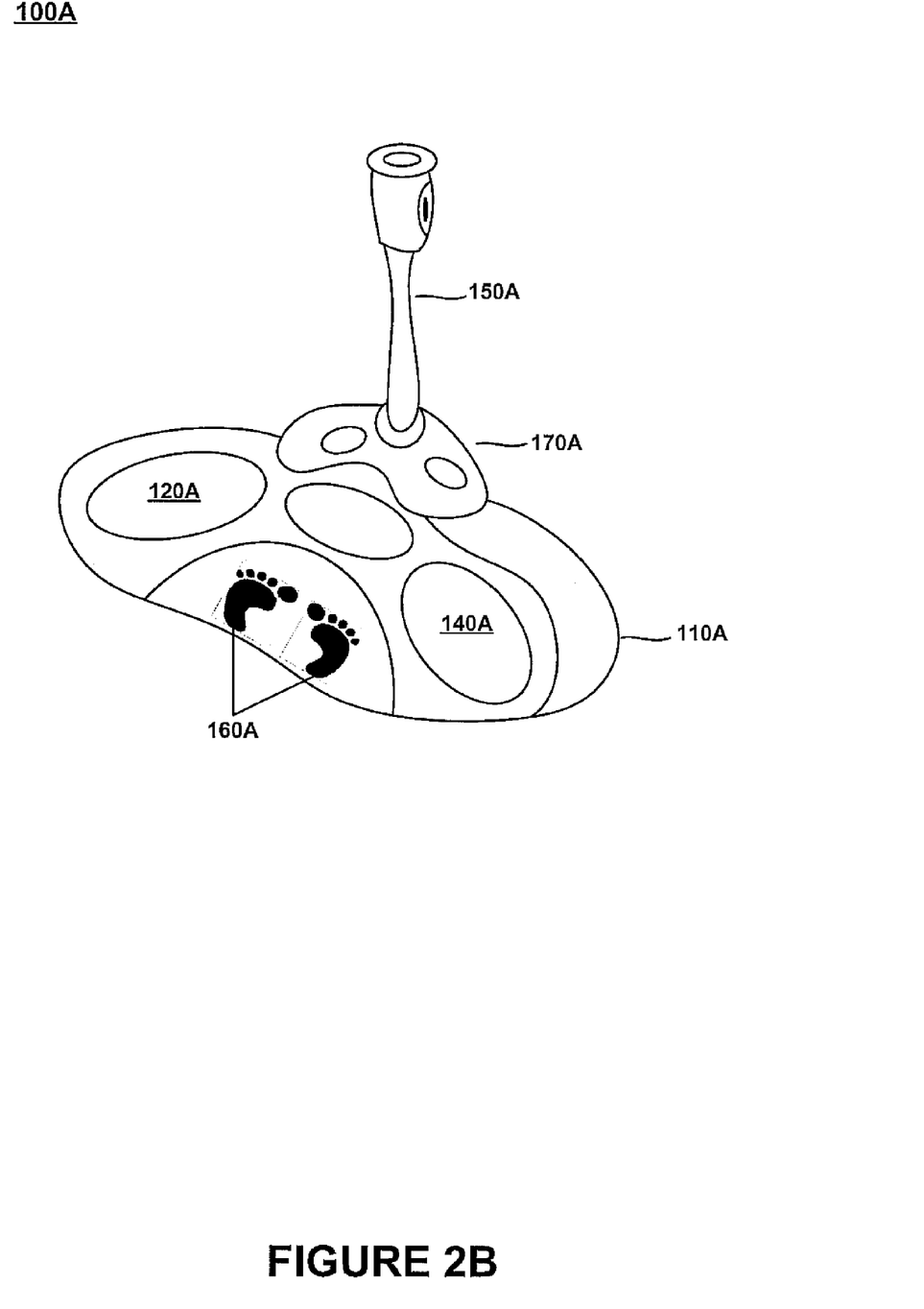
FIG. 2B illustrates an exemplary embodiment of a user interface device for controlling an audio visual system, in accordance with embodiments of the present invention.

FIG. 2B illustrates an exemplary embodiment of a user interface device 100A for controlling an audio visual system, in accordance with embodiments of the present invention. Similarly numbered reference symbols identify similar features as described in FIG. 2A. For example, device 100A includes a flexible sensor mat 110A. Sensor mat 110A is operable to be placed substantially flat, e.g., on a floor. Sensor mat 110A comprises a plurality of pressure sensors, e.g., sensors 120A and 140A. The number of sensors may vary, in accordance with embodiments of the present invention. FIG. 2B also illustrates "home" positions 160A for a user's feet, as well as control unit housing 170A and "bopper" 150A.

Figure 2C:
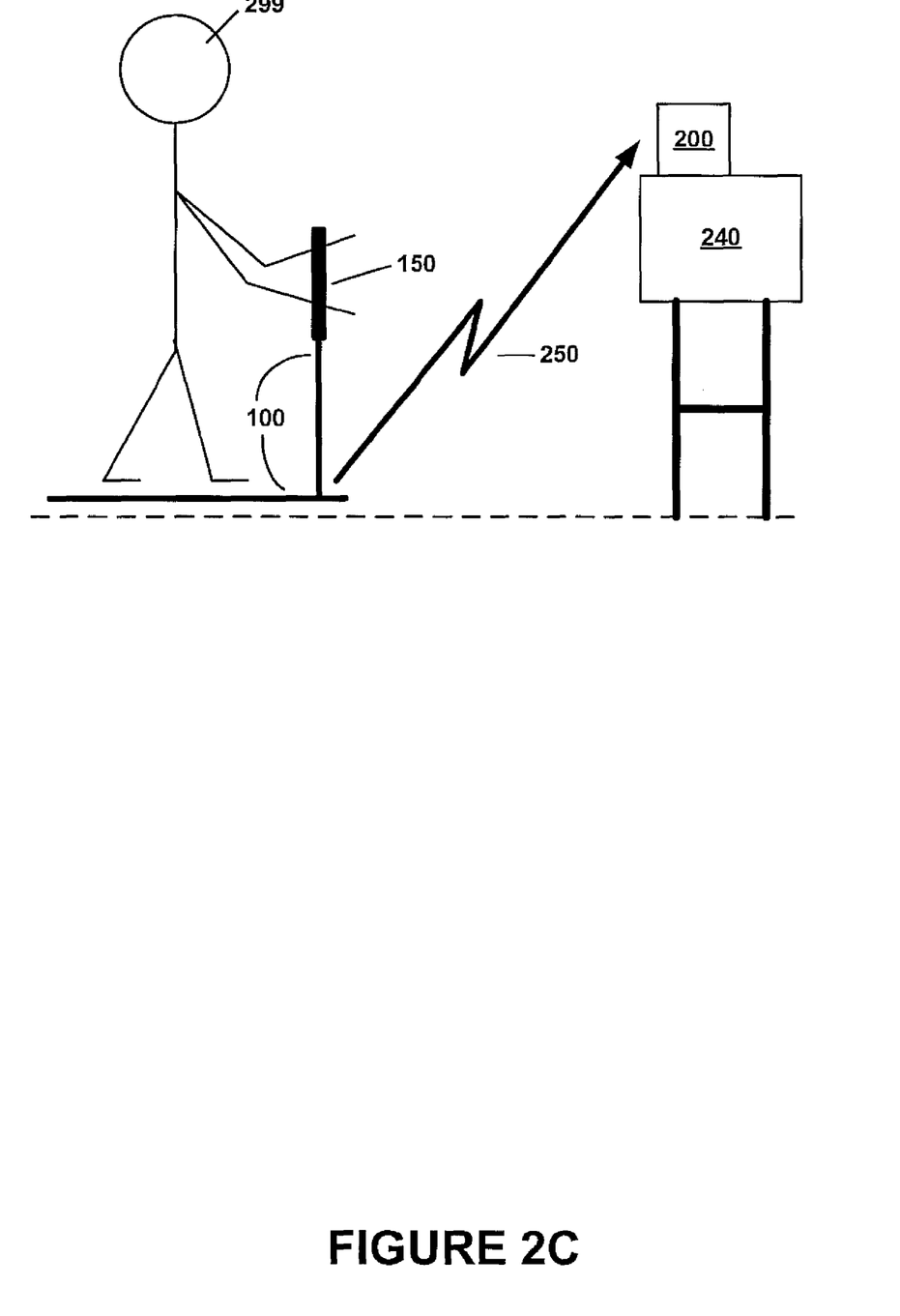
FIG. 2C illustrates an exemplary user interaction with a user interface device, in accordance with embodiments of the present invention.

FIG. 2C illustrates an exemplary user interaction with a user interface device 100, in accordance with embodiments of the present invention. The user 299, who may be a child, stands on the sensor mat 110. The user 299 may step on one of the plurality of pressure sensors, e.g., sensors 120, 130 and/or 140. The user 299 may also "bop" directional control element 150. The control system of device 100 interprets the user 299's actions, and signals 250 the receiver unit 200. The receiver unit 200 responds to the control signals and modifies its application software accordingly. For example, a character displayed on display unit 240 is caused to change direction responsive to the user 299's interaction with interface device 100.

Figure 3:
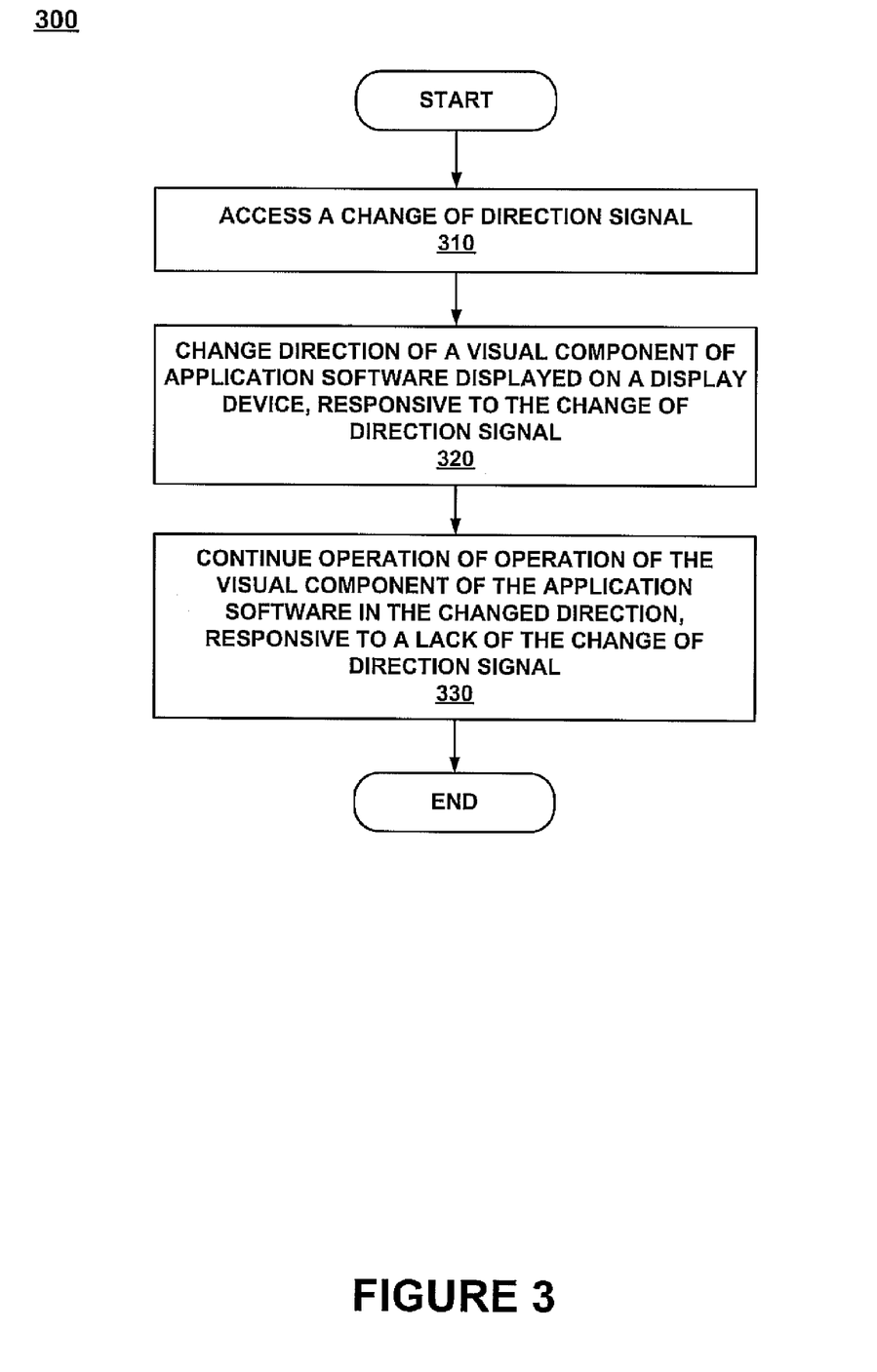
FIG. 3 illustrates a flow chart of a method for controlling an audio visual system utilizing interface device, in accordance with embodiments of the present invention.

In accordance with embodiments of the present invention, user interface software operating in receiver unit 200 (FIG. 2A) may vary from conventional user interface software to accommodate the usage model of interactive device 100 (FIG. 1). FIG. 3 illustrates a flow chart of a method 300 for controlling an audio visual system utilizing interface device 100, in accordance with embodiments of the present invention.

In 310, a change of direction signal is accessed, e.g., at receiver unit 200 (FIG. 2A). The change of direction signal may have been generated by a user striking or "bopping" direction control unit 150 of interface device 100 (FIG. 1). In 320, responsive to said change of direction signal, a direction of a visual component of application software displayed on a display device changes direction.

In 330, responsive to a lack of said change of direction signal, operation of said visual component of said application software continues in said changed direction. Upon accessing a new change of direction signal, control flow resumes at 310. In this novel manner, application software is provided continuous directional control input even though a user's control input may be substantially instantaneous, e.g., an impulse.

Embodiments in accordance with the present invention provide for systems and methods for user interface devices. In addition, embodiments in accordance with the present invention provide for systems and methods for user interface devices that are designed for interaction with young children. Further, embodiments in accordance with the present invention provide for systems and methods for user interface devices that are compatible and complementary with existing computer systems and computer-based systems.

Various embodiments of the present invention are thus described. While the present invention has been described in particular embodiments, it should be appreciated that the invention should not be construed as limited by such embodiments, but rather construed according to the below claims.

What is claimed is:

1. A device for interfacing with an audio/visual system, said device comprising:
    a sensor mat comprising a surface and operable to be disposed on a substantially flat floor, said sensor mat further operable for generating electrical signals responsive to physical interactions of a user with said surface;
    an electronic control unit comprising circuitry for coupling to said mat, said electronic control unit for detecting said physical interactions of said mat;
    an elongated shaft having a first end and a second end and physically coupled to said electronic control unit via said first end and extending laterally therefrom, said second end of said elongated shaft operable to be displaced in various directions by interactions with a hand of said user, wherein said electronic control unit is operable to detect said various directions wherein further said electronic control unit is operable to transmit signals representing said various directions and said physical interactions to a receiver unit.

2. The device as described in claim 1 further comprising said receiver unit, operable to be coupled to a display device and further operable to receive said signals representing said various directions and said physical interactions and responsive thereto, for generating audio/video signals to said display device.

3. The device as described in claim 2 wherein said signals representing said various directions and said physical interactions are transmitted wirelessly to said receiver unit.

4. The device as described in claim 2 wherein said receiver unit comprises a processor, a bus and memory for implementing a software program thereon and wherein said software program, in response to said signals representing said various directions and said physical interactions, generates said audio/video signals to said display device.

5. The device as described in claim 4 wherein said memory is removable and wherein said memory contains said software program.

6. The device as described in claim 1 wherein said various directions are forward, backward, left and right.

7. The device as described in claim 1 wherein said surface of said mat comprises a plurality of designated areas, each responsive to an interaction
therewith and each for generating unique signals for said electronic control unit to designate an interaction therewith.

8. The device as described in claim 7 wherein said surface of said mat comprises printing having images and wherein a portion of said images represents said plurality of designated areas.

9. The device as described in claim 1 wherein said surface of said mat is operable to be interacted with feet of said user.

10. A device for user input to a computer system, said device comprising:
a shaft having a nominally vertical rest position pivotably coupled to a base;
a mechanism for converting a movement of said shaft from said rest position into a plurality of electrical representations of a direction of said movement;
an electronic circuit for communicating said plurality of electrical representations to said computer system, wherein:
said base is disposed to rest on a flat surface suitable for supporting a human user;
said base is disposed for supporting said shaft in said rest position and during said movement; and
a top of said shaft is in the range of 18 to 26 inches above said flat surface when coupled to said base.

11. The device of claim 10 wherein said shaft is sized to align about mid-chest level of a child three to five years old.

12. The device of claim 10 wherein said communicating comprises wireless communications.

13. The device of claim 10 wherein said shaft comprises padding configured to cushion a user's blows to said shaft.

14. The device of claim 10 wherein said shaft and said base are disposed for operation comprising receiving striking actions from a child of less than ten years of age.

15. The device of claim 10 further comprising a sensor mat coupled to said base for receiving user input via stepping actions.

16. The device of claim 15 wherein said sensor mat is removable coupled to said base.

17. The device of claim 10 wherein said mechanism further converts a measure of displacement of said shaft from said rest position to a plurality of electrical representations of said measure of displacement for communication to said computer system.

18. The device of claim 10 wherein said mechanism further converts a measure of force applied to said shaft to a plurality of electrical representations of said measure of force for communication to said computer system.

* * * * *